Dec. 27, 1966   W. E. HENDRICK   3,293,953
DRILL BUSHING FEED DEVICE
Filed April 24, 1964   2 Sheets-Sheet 1
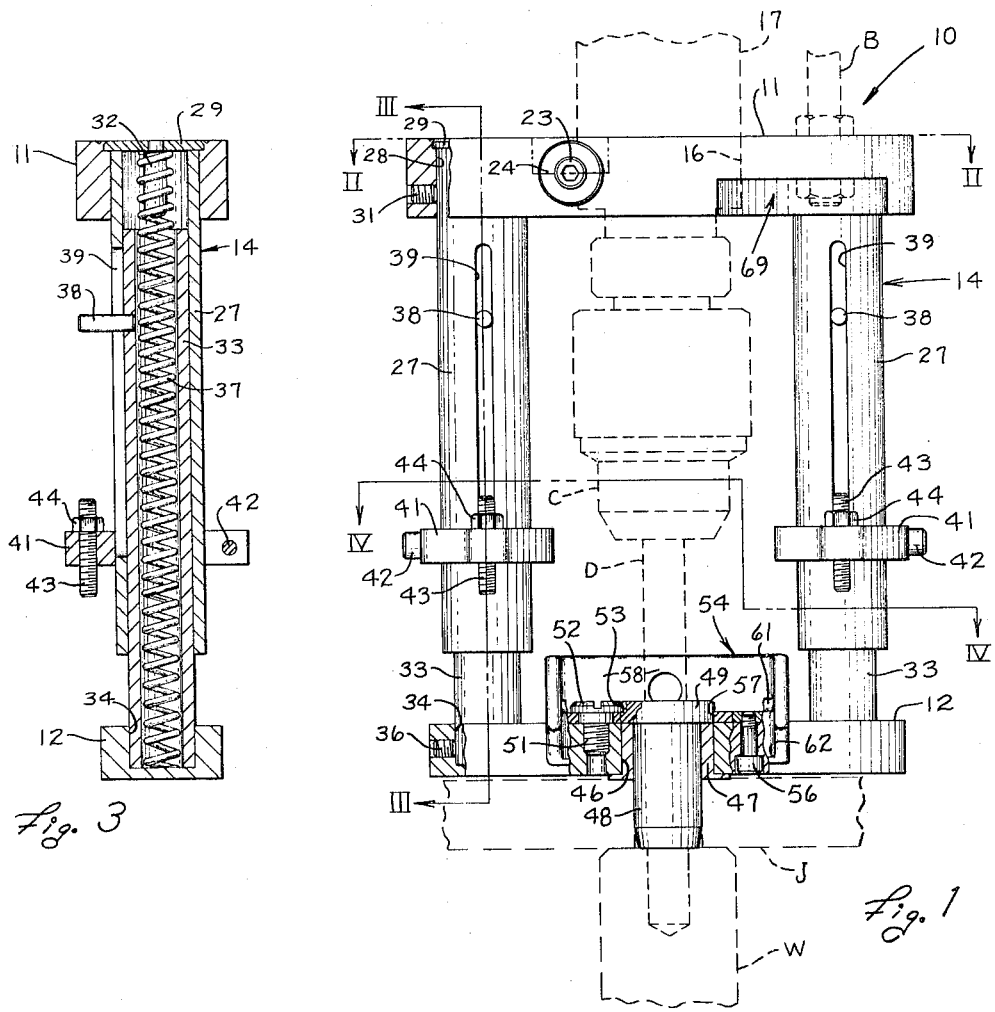
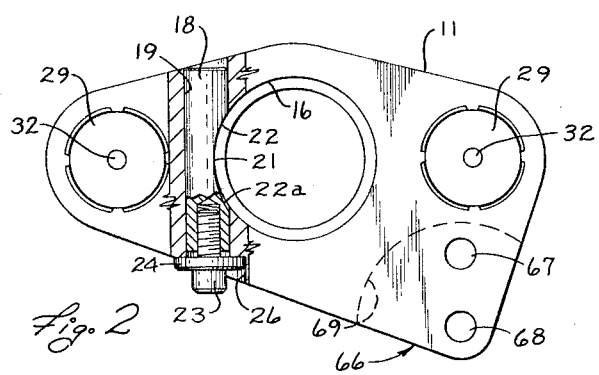
INVENTOR.
WILLIAM E. HENDRICK
BY
Woodhams, Blanchard & Flynn
ATTORNEYS Dec. 27, 1966  W. E. HENDRICK  3,293,953
DRILL BUSHING FEED DEVICE Filed April 24, 1964  2 Sheets-Sheet 2

INVENTOR.
WILLIAM E. HENDRICK
BY
Woodhams, Blanchard & Flynn
ATTORNEYS

United States Patent Office 3,293,953
Patented Dec. 27, 1966

3,293,953
DRILL BUSHING FEED DEVICE
William E. Hendrick, Comstock Township, Kalamazoo County, Mich., assignor to Galesburg Manufacturing Co., Inc., Galesburg, Mich., a corporation of Michigan
Filed Apr. 24, 1964, Ser. No. 362,260
4 Claims. (Cl. 77—55)

This invention relates to an improved drill bushing carrier and, more particularly, relates to a drill bushing carrier having improved means for supporting and guiding movement of a drill bushing toward and away from a machine tool housing.

It is common practice to guide cutting tools, such as drills, into workpieces by means of drill bushings. Particularly, it is conventional to mount drill bushings in jigs and fixtures in such fashion that the work can be properly located, within predetermined tolerances, in relation to the tool operating on the work. Where several operations are to be performed at spaced points on the same workpiece by the same tool, ordinarily a separate bushing is mounted in the appropriate location in the jig or fixture for each such operation to be performed. This is an unnecessary expense, both as regards initial cost and replacement cost, because only one drill bushing is used at one time.

It has been suggested previously to provide a drill bushing carrier which can be attached to a drill press and which can be moved from one hole to another in a jig or fixture, whereby one drill bushing can be used in performing several operations on the workpiece with the same tool. However, the structures previously suggested for this purpose have not been completely satisfactory. In some instances they require that the drill chuck, which is a part of the drill press, be removed in order to make a special connection of the drill bushing carrier to the spindle shaft of the drill press. This in return requires that the drill bushing carrier have a chuck mounted therein which increases its cost materially and unnecessarily. Also, the structure provided for guiding the movement of the drill bushing carrier toward and away from the drill press is complex and expensive, and/or does not guide such movement with sufficient accuracy, and/or includes parts which are apt to break easily.

Another problem with prior art drill bushing carriers is their inability to make effectual use of a structure for supplying a cooling or cutting liquid to the drilling zone. It is highly desirable to supply such a coolant or cutting liquid in order to cool the drill and to remove the chips produced by the drilling operation for reasons which are well understood and do not need to be repeated herein.

Accordingly, it is an object of this invention to provide an improved drill bushing carrier which can be easily and conveniently attached to a drill press without requiring the removal or alteration of the drill press chuck and which will closely and accurately guide movement of the drill bushing with respect to the drill press.

It is a further object of this invention to provide an improved drill bushing carrier, as aforesaid, in which the operating parts of the drill bushing carrier and particularly the springs used for urging the drill bushing carrier away from the drill press are completely enclosed so that they are protected from accidental breakage.

It is a further object of this invention to provide an improved drill bushing carrier, as aforesaid, having improved and simplified means for limiting movement of the drill bushing toward and away from the drill press.

It is a further object of this invention to provide an improved drill bushing carrier, as aforesaid, which is equipped with means providing a controllable flow of coolant or cutting liquid into the carrier around the drill bushing.

It is a further object of this invention to provide an improved drill bushing carrier, as aforesaid, in which a trough is mounted on the drill bushing carrier surrounding the drill bushing and which is provided with means whereby a substantially constant level of coolant or cutting liquid can be maintained in the zone around the drill bushing.

Other objects and advantages of the invention will become apparent to persons acquainted with equipment of this type upon reading the following description and inspecting the accompanying drawings.

In the drawings:

FIGURE 1 is a front elevational view, partially broken away, of the improved drill bushing carrier to which the invention relates shown mounted upon a drill press, a fragment of which is shown in broken lines.

FIGURE 2 is a sectional view taken along the line II—II of FIGURE 1.

FIGURE 3 is a sectional view taken along the line III—III of FIGURE 1.

GENERAL DESCRIPTION

Figure 4:
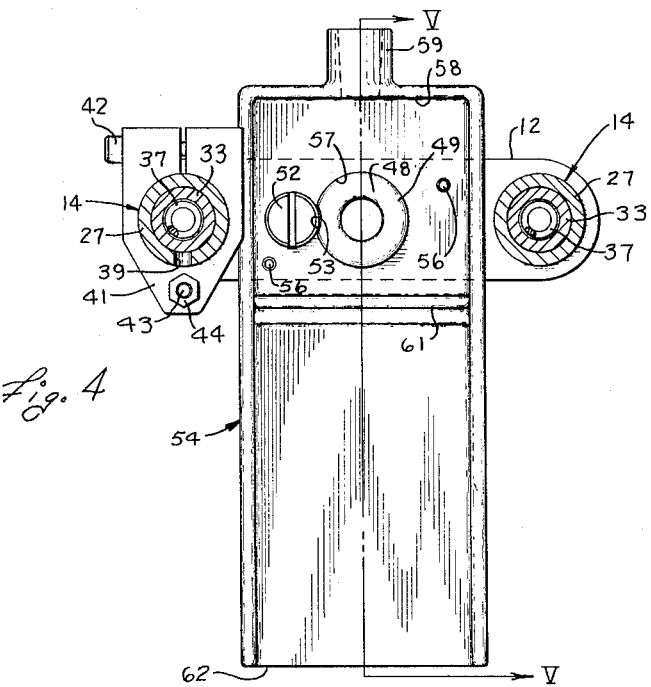
FIGURE 4 is a sectional view taken along the line IV—IV of FIGURE 1.
Figure 5:
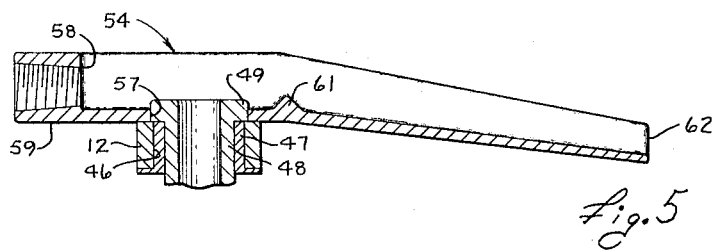
FIGURE 5 is a sectional view taken along the line V—V of FIGURE 4.

According to the invention, there is provided a drill bushing carrier which is comprised of a head member and a base member, which can be plates, and which are connected together by suitable lost motion means, such as telescoping post assemblies. Resilient means, such as coil springs, are associated with the post assemblies for urging the base member away from the head member. The telescoping post assemblies each include a pair of guide members, at least one of which is tubular and these guide members are telescopically arranged with each other and are connected respectively to the head member and the base member so that the base member can be urged away from the head member. A drill bushing is mounted in the base member and extends through a centrally located opening therein whereby a drill aligned with the drill bushing can be extended therethrough. A suitable liquid supply and guide structure is mounted on the base means around the drill bushing whereby a coolant or cutting liquid can be supplied to the zone around the drill bushing.

DETAILED DESCRIPTION

Referring to the drawing, the drill bushing carrier 10 to which the invention relates is comprised of a head plate 11, a base plate 12 and a plurality, here two, of telescoping post assemblies 14 which support said base plate 12 for movement toward and away from said head plate 11.

The head plate 11 has a central opening 16 into which can be received the reciprocable quill 17 of a drill press of any conventional type. The head plate 11 is releasably and adjustably secured to the quill 17 by means of a lock pin 18. The lock pin 18 is received within an opening 19 in the head plate 11, which opening extends substantially tangent to and intersects the central opening 16. The lock pin 18 has an elongated recess 21 between its ends, which recess is of somewhat greater length than the length of the adjacent peripheral portion of the central opening 16. The recess 21 has arcuate end walls 22 and 22a which are of substantially the same radius of curvature as the central opening 16. The lock pin 18 can be moved axially in the opening 19 by a screw 23 whose head engages a washer 24 which is received in a recess 26 in the side wall of the head plate 11. Thus, the lock pin 18 can be moved in a direction substantially tangent to the quill 17 until the end wall 22 of the recess 21 engages the quill 17, and releasably fixedly secures it to said head plate.

The two telescoping post assemblies 14 are identical and, hence, the same reference numerals are used to identify corresponding parts thereof. The post assemblies are disposed on diametrically opposite sides of the central opening 16 and they each include an outer tube 27 whose upper end extends into an opening 28 in the head plate 11 and is held in place therein by a retainer disk 29 affixed to said head plate by suitable means, such as staking, and by a set screw 31. A centering pin 32 is secured to the disk 29 and extends therefrom into the outer tube 27 for purposes which will become apparent as the description proceeds.

The post assemblies 14, also each include an inner tube 33 whose lower end extends into a blind recess 34 in the base plate 12 and is secured therein by a set screw 36. The inner tube 33 is closely slidably telescoped within the outer tube 27 so that its movement is closely guided thereby. A coil spring 37 is disposed within the inner tube 33 with its lower end engaging the bottom of the recess 34 and its upper end engaging the retainer plate 29. The spring 37 encircles the center pin 32 so that it is centered thereby.

A guide and liftup pin 38 is affixed to the inner tube 33 close to the upper end thereof. The pin extends radially from the inner tube 33 through an axially extending, elongated slot 39 in the outer tube 27. The pin 38 is engageable with the upper end of the slot 39 in order to stop movement of the base plate 12 toward the head plate 11. A radially split collar 41 is vertically adjustably affixed to the outer tube 27 close to the lower end thereof by a clamping screw 42. The collar 41 carries a vertically adjustable screw 43 which is engageable with the pin 38 to limit movement of the base plate 12 under the urging of the spring 37 away from the head plate 11. Thus, when the head plate 11 is being moved away from the workpiece, engagement of pin 38 with the screw 43 causes the base plate 12 to be lifted off the workpiece. The screw 43 is fixed in position by a lock nut 44.

The base plate 12 has a central opening 46 therethrough coaxial with the central opening 16 in the head plate 11. A cylindrical bushing liner 47 extends through the opening 46. A drill bushing 48 extends through the central opening of the liner 47 and said bushing has an enlarged head 49 which rests on the upper surface of the base plate 12. The drill bushing 48 is held in position by a locking screw 51 which is threaded into the base plate 12 and whose head 52 is received in a recess 53 in the head 49 of the drill bushing 48. The drill bushing has a tapered lower end to facilitate entry and location of the bushing in the jig.

A trough 54, which is substantially channel-shaped in cross section, is mounted on the upper surface of the base plate 12 and is affixed thereto by screws 56 and by the locking screw 51. The trough 54 has an opening 57 through its base wall and the head 49 of the drill bushing 48 extends through said opening. The trough 54 has an end wall 58 at one end thereof, said end wall being provided with a threaded nipple 59 so that a hose for supplying coolant or cutting liquid can be connected thereto. The trough 54 also has an integral rib 61 projecting upwardly from the base wall thereof and extending between the two side walls thereof. The rib 61 is on the opposite side of the opening 57 from the end wall 58. The rib 61 projects upwardly from the base wall of the trough to a point at least as high as the upper surface of the drill bushing 48. Thus, the rib 61 functions as a dam or weir to insure a substantially constant level of coolant or cutting liquid in the region of the drill bushing but permits excess liquid to overflow for discharge through the open end 62 of the trough 54 into a suitable receptacle. In this fashion the drilling residues can be effectively removed from the drilling zone. Also, the trough facilitates the carrying away of the chips so that they will not enter other openings in the jig. This eliminates the necessity of frequent cleaning of the jig openings with an air hose.

The head plate 11 has an enlarged portion 66 at one end thereof, which portion has holes 67 and 68 therethrough and an arcuate recess 69 on its underside. The conventional stop bar B of the drill press can be extended through one of the holes 67 and 68 and secured to said head plate 11 by lock nuts so that it extends upwardly therefrom for cooperation with the conventional stop mechanism of the drill press.

ASSEMBLY AND OPERATION

While the assembly and operation of the drill bushing carrier 10 is believed to be obvious from the foregoing description, the same will be briefly described to assure a complete understanding of the invention.

Drill presses ordinarily have a clamp collar or bracket mounted on the quill 17 thereof for supporting the conventional stop bar B. This clamp collar is removed before the bushing carrier 10 is mounted on the quill 17 because the enlarged portion 66 of head plate 11 serves as a support for the stop bar. The bushing carrier 10 is mounted on the quill 17 by sleeving the head plate 11 on the quill to the appropriate location thereon and then rotating the screw 23 to draw the arcuate end wall 22 of the recess 21 of the locking pin 18 into tight engagement with said quill. The collars 41 can be adjusted along the outer tubes 27 to provide the approximate maximum desired spacing between the base plate 12 and the head plate 11 when the springs are in their extended position. A fine adjustment of such position is effected by vertically adjusting the screws 43 with respect to the collars 41. A drill bushing 48 of the appropriate internal diameter for the cutting operation to be performed is affixed to the base plate 12 either before or after the mounting thereof on the quill. In this connection, it is within the purview of the invention to provide a series of drill bushings which have different internal diameters but which are otherwise identical, so that a drill bushing of the proper size for the particular drilling operation to be performed can be provided.

In operation, it may be assumed that it is desired to drill a plurality of holes of the same diameter, although perhaps of different depth, in a workpiece W. The workpiece W has a jig J releasably affixed thereto and the jig has a series of openings therethrough whose locations correspond to the locations of the holes to be drilled in the workpiece.

With the drill bushing 48 being spaced sufficiently from the jig J, said jig and the workpiece W can be moved with respect to the drill bushing so that the opening in the jig J corresponding to the next opening to be drilled is brought into approximate alignment with the drill bushing. Then the quill 17 is lowered by the conventional mechanism provided for this purpose in the drill press and slight adjustments of the position of the jig J and the workpiece W are carried out so that the drill bushing 48 can be closely slidably received in the opening in the jig. While this is taking place, the springs 37 are extended and the base plate 12 and the head plate 11 are spaced apart the maximum distance as determined by the positions of the screws 43. Then the drill D, which is held in a chuck C attached to the spindle, rotatably mounted in quill 17, is rotated. The quill 17 is moved downwardly so that the drill moves through the bushing 48 and drills a hole in the workpiece. This also moves the head plate 11 toward the base plate 12 against the contrary urging of the springs 37. Thus, the base plate 12 is resiliently held in engagement with the jig J. The depth of the hole drilled in the workpiece normally is determined by an appropriate stop control in the drill press, including the stop bar B, but in any event engagement of the pin 38 with the upper end of the slot 39 will serve as a safety device to stop further entry of the drill into the workpiece in case the conventional depth control provided on the drill press is not functioning.

It is to be noted that if long chips drilled from the workpiece follow the flutes of the drill and project sidewardly therefrom, they will strike one or the other of the post assemblies 14 and will be broken off thereby as the drill rotates.

When the quill 17 is raised at the end of a drilling operation, first the drill will be removed from the workpiece. During this time, the base plate 12 will remain in engagement with the jig J under the urging of the springs 37 while head plate 11 will be moving away from said base plate. Eventually, however, continued movement of the quill 17 will cause screw 43 to engage pin 38 so that the base plate 12 will be lifted off the jig whereby the drill bushing 48 is moved out of the jig. The jig and workpiece can then be positioned for a subsequent drilling operation.

A coolant or a cutting liquid can be supplied to the drill bushing during a drilling operation. Because of the rib 61, a substantially constant level of liquid is present at and around the upper end of the drill bushing 48 whereby the drill can be kept cool and the drilling residues can be removed thereby. Where there is a continuous flow of coolant or cutting liquid into the trough, there will be a continuous overflow of the liquid over the rib 61 and such overflowing liquid can be collected in a suitable receptacle for cleaning and reuse. In this fashion, the drilling chips can be quickly disposed of and the drilling operation can proceed with a minimum of difficulty.

The use of post assemblies 14, each comprising an inner and outer tube which closely slidably telescope each other, assures a closely guided movement of the base plate 12 with respect to the head plate 11 whereby the drill bushing is maintained in predetermined alignmetn with the drill quill 17 at all times. Hence, the drill bushing 48 can have a close fit with the drill to assure an accurately guided entry of the drill into the workpiece. Moreover, because the springs 37 are disposed within the inner tube they are protected from accidental damage. The collar 41 and adjusting screws 43 make it possible to achieve in an easy and convenient fashion an extremely accurate adjustment of the maximum spacing of the base plate 12 and the head plate 11.

Figure 6:
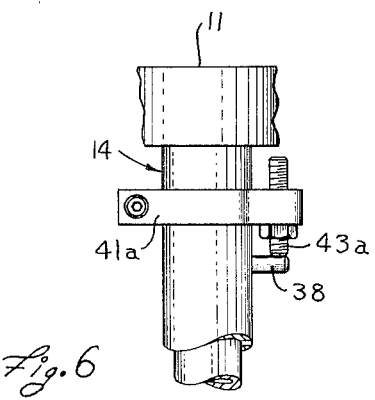
FIGURE 6 is a view corresponding to a fragment of FIGURE 1, showing a modification.

FIGURE 6 shows a modification of one post assembly 14 in which it is equipped with an upper collar 41a, in addition to the lower collar 41. The upper collar 41a is identical to the lower collar except that it is inverted so that its adjusting screw 43a extends downwardly. The upper collar is positioned above the pin 38 so that its screw 43a serves as a positive stop for limiting movement of the base plate 12 toward the head plate 11. Thus, if the drill press depth control is not functioning or if the drill has no such control, the depth of the hole drilled in the workpiece is positively controlled by the collar 41a.

The drill bushing carrier can be easily and quickly attached to conventional drill presses and does not require any alteration in the structure thereof other than removal of the clamp collar. Moreover, the chuck conventionally provided on the drill presses can continue to be used for its intended purpose. Further, because of its simple construction, the drill press carrier 10 can be manufactured inexpensively.

While a particular preferred embodiment of the invention has been described, the invention contemplates such changes or modifications therein as lie within the scope of the appended claims.

What is claimed is:

1. A drill bushing carrier, comprising:
head means having a central opening therethrough for receiving a drill press quill;
base means having a central opening therethrough aligned with the central opening of said head means; means continuously urging said base means away from said head means, said last-named means comprising two pairs of guide members provided on said base means and said head means on opposite sides of said central openings, each pair of guide members comprising a first guide member secured to said head means and extending away therefrom toward said base means, and a second guide member secured to said base means and extending away therefrom toward said head means, said guide members of each pair being tubular and said guide members being in close slideable and telescopic engagement with each other whereby said base means is closely guided for movement toward and away from said head means, the innermost guide member of each pair having a radially outwardly extending pin affixed thereto and the outermost guide member of each pair having an elongated slot through which said pin extends, stop means vertically adjustably mounted on said outermost member for engagement with said pin;
a coil spring disposed within said innermost member of each pair of guide members and engaging said head means and said base means at its opposite ends for urging the guide members of each pair apart; and
a drill bushing mounted on said base means and extending through said central opening thereof.

2. A drill bushing carrier comprising:
head means having a central opening therethrough for receiving a drill press quill;
base means having a central opening therethrough aligned with the central opening of said head means;
means connecting and resiliently urging apart said head means and said base means;
a drill bushing mounted on said base means and projecting through the central opening thereof; and
a trough mounted on said base means surrounding the upper end of said drill bushing and having means for maintaining a liquid level therearound, said trough having a portion for directing excess liquid to a collecting system.

3. A drill bushing carrier according to claim 2, in which the trough is substantially channel-shaped and has an upstanding end wall on one side of said central opening in said base means and has an upstanding dam on the other side of said central opening whereby said dam maintains a liquid level in said trough at least as high as the upper end of the drill bushing which permits excess liquid to overflow the dam, the trough having an open-ended portion extending away from the dam.

4. A drill bushing carrier, comprising:
a head plate having a central opening therethrough for receiving a drill press quill;
a base plate having a central opening therethrough aligned with the central opening in the head plate;
a pair of telescoping post assemblies connecting together said head plate and said base plate, said assemblies being disposed on opposite sides of said central openings and each thereof comprising a pair of elongated, telescoping tubes respectively connected at their opposite ends to said head plate and said base plate, a coil spring disposed within the innermost tube and having its opposite ends engaging said head plate and said base plate whereby said plates are urged apart by said spring, a pin affixed to one of said tubes and projecting through an elongated slot in the other tube, a stop collar vertically adjustably secured to the other tube and carrying means engageable with said pin for limiting movement of said plates away from each other;
a cylindrical bushing liner mounted on said base plate and extending through the central opening therein;
a drill bushing extending through said bushing liner, said drill bushing having an enlarged head disposed on top of the upper surface of said base plate and means engageable with said head for releasably securing said drill bushing to said base plate;
a substantially channel-shaped trough mounted on the upper surface of said base plate, said trough having an opening through which said head projects, said trough having an upstanding end wall on one side of said opening in said trough and means for supplying a liquid through said end wall, said trough having an upstanding rib on the other side of said opening in said trough, said rib extending upwardly at least as far as the upper end of the bushing whereby the liquid is maintained between said end wall and said rib at a level at least as high as the upper end of the drill bushing, said trough having an open-ended end portion extending away from the rib whereby the liquid can be directed to a collecting receptacle.

References Cited by the Examiner

UNITED STATES PATENTS

| | | | |
|---|---|---|---|
| 1,831,813 | 11/1931 | Levedahl | 77—55 |
| 2,260,635 | 10/1941 | Musselman | 77—27 X |
| 2,374,874 | 5/1945 | McKee | 77—55 |
| 2,725,639 | 12/1955 | Yungman | 77—62 |
| 2,925,690 | 2/1960 | Dayton et al. | 77—55 |

FOREIGN PATENTS

| | | |
|---|---|---|
| 1,007,649 | 2/1952 | France. |
| 595,226 | 6/1959 | Italy. |

FRANCIS S. HUSAR, *Primary Examiner.*